(12) United States Patent
Birke et al.

(10) Patent No.: US 7,342,143 B2
(45) Date of Patent: Mar. 11, 2008

(54) POLYALPHAOLEFIN HAVING A LOW HALIDE CONCENTRATION AND A METHOD OF MANUFACTURING THEREOF

(75) Inventors: Peter Birke, Leuna (DE); Kristi Ann Morris, Seabrook, TX (US); Hans-Dieter Neubauer, Leuna (DE); Rainer Schoedel, Leuna (DE)

(73) Assignee: Shell Oil Company, Houston, TX (US)

( * ) Notice: Subject to any disclaimer, the term of this patent is extended or adjusted under 35 U.S.C. 154(b) by 442 days.

(21) Appl. No.: 10/937,590

(22) Filed: Sep. 9, 2004

(65) Prior Publication Data

US 2005/0256351 A1   Nov. 17, 2005

(30) Foreign Application Priority Data

Sep. 12, 2003   (EP) .................................. 03020760

(51) Int. Cl.
*C10L 1/16* (2006.01)
*C10L 5/00* (2006.01)
*C10M 101/02* (2006.01)
*C10M 107/00* (2006.01)
*C10M 143/00* (2006.01)
*C10M 165/00* (2006.01)
*C10M 167/00* (2006.01)
*C10M 169/00* (2006.01)
*C10M 171/00* (2006.01)

(52) U.S. Cl. ........................... 585/250; 585/10; 585/12; 585/255

(58) Field of Classification Search .................. 585/10, 585/11, 12, 20, 250, 255, 525, 532
See application file for complete search history.

(56) References Cited

U.S. PATENT DOCUMENTS

| 4,827,064 | A | * | 5/1989 | Wu .............................. 585/10 |
| 5,196,630 | A | * | 3/1993 | Agrawal et al. ............ 585/860 |
| 5,573,657 | A | * | 11/1996 | Degnan et al. ............. 208/144 |
| 5,747,596 | A | * | 5/1998 | Emert et al. ................. 525/298 |
| 6,395,948 | B1 | | 5/2002 | Hope et al. .................. 585/510 |
| 6,433,104 | B1 | | 8/2002 | Macedo et al. ............. 525/338 |
| 2002/0128532 | A1 | | 9/2002 | Hope et al. ................. 585/521 |
| 2003/0032847 | A1 | | 2/2003 | Reynolds ..................... 585/271 |
| 2005/0256351 | A1 | * | 11/2005 | Birke et al. ................... 585/10 |

FOREIGN PATENT DOCUMENTS

EP            687692        12/1995

OTHER PUBLICATIONS

Gallo et al., "Unsaturation in Isoprene-Isobutylene Copolymers" Industrial and Engineering Chemistry, vol. 40. (1948) pp. 1277-1280.

* cited by examiner

*Primary Examiner*—Walter D. Griffin
*Assistant Examiner*—Frank C Campanell
(74) *Attorney, Agent, or Firm*—Charles W. Stewart

(57) ABSTRACT

A method for the processing of a polyalphaolefin feedstock having a concentration of organic halide to thereby yield a polyalphaolefin end-product having a low concentration of organic halide. The method includes a hydrogenation step whereby the polyalphaolefin feedstock is contacted under suitable reaction conditions with a specific hydrogenation catalyst composition that is resistant to halide deactivation. The hydrogenation catalyst comprises a noble metal on a support material comprising silica and alumina. The hydrogenated polyalphaolefin feedstock is further processed to remove the hydrogen halide produced during the hydrogenation step to yield the polyalphaolefin end-product.

19 Claims, 1 Drawing Sheet

Figure 1:
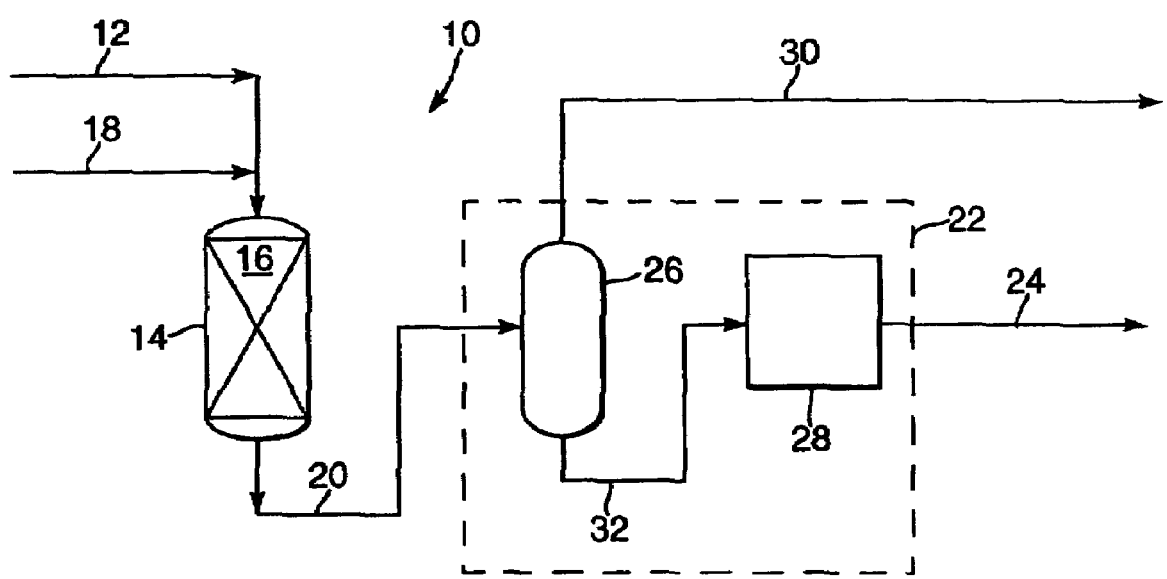

POLYALPHAOLEFIN HAVING A LOW HALIDE CONCENTRATION AND A METHOD OF MANUFACTURING THEREOF

This invention relates to a method of processing polyalphaolefins. One aspect of the invention relates to a polyalphaolefin product having a low concentration of halides or halide compounds and the manufacture of such a product.

Polyalphaolefins make a very desirable lubricant base oil blending stock due to their physical properties of, such as, a high viscosity index and low pour point. Polyalphaolefins are made by the oligomerization of normal alpha olefin to form an oligomerization product, followed by hydrogenation of the oligomerization product to hydrogenate the unsaturates therein. The normal alpha olefins can be oligomerized thermally or catalytically in the presence of catalysts such as, for example, Friedel-Crafts catalysts and ionic liquid catalysts.

When certain types of chlorine-containing oligomerization catalysts, such as halogen-containing Friedel-Crafts acids and ionic liquids, are used to manufacture polyalphaolefins, small quantities of halide compounds, including organic halides such as organic chlorides, are formed and pass with the oligomerization product that is to be hydrogenated. These halide compounds, however, have a detrimental deactivating impact on certain types of hydrogenation catalysts and make the use of the chlorine-containing oligomerization catalysts less beneficial than other types of oligomerization catalysts. Another disadvantage caused by the formation of the halide compounds in the oligomerization of normal alpha olefins is that a small concentration of certain halide compounds in a polyalphaolefin material can make it unsuitable for use as product, particularly as a lubricating base oil blending stock product due to the corrosive effects that the halide compound can have on metal parts.

It is an object of the invention to provide a method for hydrogenating a polyalphaolefin stream that has a concentration of a halide compound.

It is another object of the invention to provide a method of processing a polyalphaolefin stream having a concentration of organic halide in order to provide a polyalphaolefin product having a low halide concentration.

Accordingly, the invention includes a method which comprises contacting under hydrogenation conditions a polyalphaolefin feed stream with a hydrogenation catalyst to yield an intermediate polyalphaolefin product. The polyalphaolefin feed stream has a concentration of organic halide and the intermediate polyalphaolefin product has a concentration of hydrogen halide. In a further embodiment of the invention, the intermediate polyalphaolefin product is processed to remove at least a portion of the hydrogen halide to provide a polyalphaolefin product that has a low concentration of halide compounds.

Another invention includes a polyalphaolefin product composition having a low concentration of halide compounds. In one embodiment of the inventive polyalphaolefin product composition, such a composition is made by the hydrogenation of a polyalphaolefin feed stream that has a concentration of organic halide.

Other objects and advantages of the invention will become apparent from the following detailed description and appended claims.

FIG. 1 is a schematic diagram representing various features and aspects of the inventive method for processing a polyalphaolefin feed stream that has a concentration of halide compound to yield a polyalphaolefin product having a low concentration of halide compound.

The polyalphaolefin feedstock or feed stream that is processed by the inventive method can be obtained from any know source. The inventive method is particularly useful in the processing of a polyalphaolefin feedstock that has a undesirably high concentration of a halide compound which generally can be any halide compound that can be contaminating.

Generally, the polyalphaolefin feedstock of the inventive method can be the oligomer product from the oligomerization, preferably a catalyzed oligomerization, of one or more alpha olefins to form a dimer, trimer, tetramer, or pentamer thereof. As the term is used herein, an alpha olefin is defined as a monoolefin in which the double bond thereof is at the alpha position of the carbon chain of the monoolefin. It is preferred for the alpha olefin to be linear. The alpha olefins that are oligomerized can have from about 4 to about 18 carbon atoms per molecule, but, more specifically, from 6 to 16 carbon atoms per molecule. It is preferred for the alpha olefin used to produce the polyalphaolefin feed to be selected from those alpha olefins having from 6 to 14 carbon atoms per molecule, for example, 1-hexene, 1-octene, 1-decene, 1-dodecene, and 1-tetradecene. Especially preferred alpha olefins for the manufacture of the polyalphaolefin feed are 1-hexene, 1-decene and 1-dodecene, and, among these, most preferred is either 1-decene or 1-dodecene.

An alpha olefin feed used in the manufacture of the polyalphaolefin feedstock of the inventive method can comprise substantially one type, i.e. number of carbon atoms per molecule, of alpha olefin or it can be a mixture of two or more types of alpha olefins.

In the manufacture of the polyalphaolefin feedstock that is processed by the inventive method, generally, an alpha olefin feed comprising an alpha olefin is either thermally or catalytically oligomerized under effective oligomerization reaction conditions to form an oligomer of the alpha olefin, such as, for example, a dimer, trimer, tetramer, or pentamer thereof thereby forming the polyalphaolefin feed. Typical catalysts used in the catalyzed oligomerization of the alpha olefins include Friedel-Crafts type acid catalysts, for example, the aluminum halides and other metal halides, for instance, $AlCl_3$, $AlBr_3$, $AlF_3$, $BF_3$, $BCl_3$, $BBr_3$, $TiCl_4$ and the like, the alkyl aluminum halides, for instance, those having the formulas $R_2AlCl$ and $RAlCl_2$, where R is hydrogen or an alkyl group having from 1 to 10 carbon atoms, and the alkyl aluminums, for instance, those having the formula $R_3Al$, where R is either hydrogen or an alkyl group having from 1 to 10 carbon atoms. Also, the catalyst used in the catalyzed oligomerization of the alpha olefins can include, either alone or in combination with a Friedel-Crafts catalyst, an ionic liquid, for example, those compounds having a general formula $Q^+A^-$, where $Q^+$ is a quaternary ammonium, quaternary phosphonium, or quaternary sulfonium, and $A^-$ is negatively charged ion such as $Cl^-$, $Br^-$, $OCl_4^-$, $NO_3^-$, $BF_4^-$, $BCl_4^-$, $PF_6^-$, $SbF_6^-$, $AlCl_4^-$, $ArF_6^-$, $TaF_6^-$, $CuCl_2^-$, $FeCl_3^-$, $SO_3CF_3^-$, $SO_3C_7^-$, and 3-sulfurtrioxyphenyl. Examples of such ionic liquids and their use are described in detail in U.S. Pat. No. 6,395,948 B1 and in U.S. Patent Application Pub. No. 2002/0128532 A1, both of which are incorporated herein by reference.

To provide a more desirable polyalphaolefin end-product, the oligomerized product from the aforedescribed oligomerization process is hydrogenated by known methods to reduce the amount of unsaturation in the oligomerized polyalphaolefin product. One recently recognized problem, however, is that, with the use of many of the aforementioned types of oligomerization catalysts, small amounts of halide compounds are formed during the oligomerization reaction. These halide compounds can have significant detrimental and deactivating effects on the conventional hydrogenation catalysts that are typically used to hydrogenate an oligomerization product.

It is one of the features of the inventive method to provide a process for treating an oligomerized product, having a concentration of a halide compound, that uses a hydrogenation catalyst which is particularly resistant to the effects of halide compounds upon its hydrogenation activity. The hydrogenation catalyst is preferably a dual functionality catalyst in that it provides for both the conversion of such halide compounds as the organic halides and for the hydrogenation of the unsaturated compounds in the oligermized product.

The halide compound that is in the oligomerized product can be any halide-containing compound resulting from the oligomerization of alpha olefin to yield an oligomerized product and that is not a desired component of a polyalphaolefin end-product. Generally, the halide compound is an organic halide such as an alkyl halide of the formula RX, where R is an alkyl group generally having from 4 to 100 or more carbon atoms, but, more typically, from 10 to 40 carbon atoms. The most typical organic halide compound is an organic chloride such as alkyl chloride. While not wanting to be bound to any particular theory, it is nevertheless believed that the alkyl halides are formed by reactions between a halide-containing oligomerization catalyst and alpha olefin during the oligomerization reaction as described above.

The concentration of organic halide in the oligomerization product is such as to provide a halogen concentration in the range exceeding 100 parts per million by weight (ppmw) to about 15,000 ppm; but, more typically, the halogen concentration is in the range of from 150 ppmw to 2000 ppmw. Most typically, however, the organic halide concentration in the oligomerization product is such that the halogen concentration is in the range of from 200 ppmw to 1500 ppmw. Any suitable method known to those skilled in the art can be used to determine the organic halide or halogen concentrations of the oligomerization product. One possible method for determining the halogen content of the oligomerization product includes combustion of a sample of the oligomerization product and absorbing the combustion products by an aqueous solution in which the halogen content is determined by the use of a previously calibrated Specific Ion Electrode.

The oligomerization product generally includes unsaturated compounds that can impart certain undesirable properties to a polyalphaolefin end-product, for example, oxidative instability. The unsaturated compounds can include olefins. There can be several measures of the unsaturation of a polyalphaolefin material, one of which is the Bromine Index and another is the Iodine Number. The Iodine Number is defined as the number of grams of iodine that react with the double bounds of a sample material per 100 grams of the sample material. The method is described in detail in the article of Gallo et al., "Unsaturation in Isoprene-Isobutylene Copolymers", Industrial and Engineering Chemistry, Vol. 40, (1948) pp. 1277-1280. The oligomerization product will generally have a high Iodine Number demonstrating a generally unacceptable level of unsaturation thereby requiring hydrogenation in order to reduce the level of unsaturation to an acceptable level, such as, an Iodine Number of less than about 30, but, preferably, less than 20, and, most preferably, less than 10.

The oligomerization product, having a concentration of organic halide, is charged as a polyalphaolefin feedstock to a reaction zone defined by a reactor vessel which contains a hydrogenation catalyst, as hereafter described in detail, wherein the polyalphaolefin feedstock is contacted with the hydrogenation catalyst under such suitable reaction conditions as to convert at least a portion of the organic halide to form, among other compounds, hydrogen halide and to hydrogenate at least a portion of the unsaturated compounds in the polyalphaolefin feedstock.

As noted above, certain types of conventional hydrogenation catalysts, such as the nickel hydrogenation catalysts known to those skilled in the art, have been found in certain situations to be unsuitable for use in the hydrogenation of a polyalphaolefin feedstock that has a high concentration of organic halide. This is due to the poisoning effect that halides have on the catalyst's ability to perform as a hydrogenation catalyst. It has been discovered, however, that a specific catalyst composition comprising a noble metal on a special support material has especially good properties in the treatment of a polyalphaolefin feedstock having a high organic halide concentration, and such hydrogenation catalyst is used in the inventive method for processing the polyalphaolefin feedstock to produce a polyalphaolefin end-product having a low concentration of halide compounds such as the organic halides and the hydrogen halides.

The hydrogenation catalyst of the inventive method, generally, comprises a noble metal selected from either platinum or palladium and an inorganic support material. The inorganic support material can be in the form of a mixture of amorphous silica and amorphous alumina or it can be in the form of amorphous silicoaluminate, or a mixture of each form; but, in any case, the inorganic support material comprises silica present in an amount in the range of from about 10 to about 60 weight percent and alumina present in an amount in the range of from about 40 to about 90 weight percent, with the weight percents being based on the total weight of the inorganic support material. It is preferred for the silica to be present in the inorganic support material in the range of from 20 to 50 weight percent and the alumina to be present in the range of from 50 to 80 weight percent, and, most preferred, the inorganic support material includes from 30 to 45 weight percent silica and 55 to 70 weight percent alumina.

The noble metal component is supported on the inorganic support material of the hydrogenation catalyst and should be present therein at a noble metal concentration in the range of from about 0.1 to about 8 weight percent with the weight percent being based on the total weight of all the components of the hydrogenation catalyst. A preferred noble metal concentration is in the range of from 0.3 to 5 weight percent, and, most preferably, the noble metal concentration is in the range of from 0.5 to 4 weight percent. In certain applications, however, it can be best for the noble metal concentration to be in the range of from 0.5 to 1.5 weight percent. Among the noble metals, palladium is the more preferred.

When referring herein to the noble metal component of the hydrogenation catalyst, it should be recognized that the noble metal can be in any form, such as, for example, the elemental form or a metal compound including oxides. The weight percent concentrations are of the metal, regardless of its form.

It is preferred for the inorganic support material of the hydrogenation catalyst to be formed into shaped particles prior to incorporation of the noble metal therein to thereby form the hydrogenation catalyst. Examples of such shaped particles include extrudates, pellets, spheres, pills and the like. In a particularly preferred method for preparing the shaped particles of inorganic support material, a silicoaluminate powder, or a mixture of silica and alumina powders, is formed into an extrudable paste, the paste is extruded to form extrudates, and the extrudates are dried and calcined to thereby provide the shaped particles of the inorganic support material into which the noble metal is incorporated.

The extrudable paste can be formed by any suitable known method, but a preferred method includes mixing the silicoaluminate powder, or silica and alumina powders, with water and adding a suitable peptizing agent in an amount that effectively peptizes the powder. The peptizing agent can include an acid, such as, for example, nitric acid, acetic acid, and hydrochloric acid, with nitric acid being presently preferred. It is best for the peptizing agent to be in the form of a dilute solution or an aqueous solution of the acid generally at an acid concentration in the range of from about 1 weight percent to about 15 weight percent of the solution, with the weight percent concentration of the acid being defined as the ratio of the weight of the acid compound to the weight of the total solution multiplied by a factor of 100.

An effective plasticizing amount of a plasticizer can also be mixed with the inorganic support material, water and peptizing agent to promote the formation of a plastic mass, or extrudable paste, that can effectively be extruded to form extrudate particles comprising the inorganic support material. The plasticizer can be any suitable organic compound that effectively provides for the formation of the extrudable paste. Such compounds include, for example, esters of carboxylic acids and phosphoric acid.

Any suitable method and extrusion equipment known to those skilled in the art can be used to make the extrudates. Examples of such extrusion equipment include extruders for conveying a force onto the extrudable paste in order to pass it through a die plate to produce desirable shapes or extrusion profiles. A typical extrudate can be described as a cylindrical shape having a diameter and a length, but other shapes can also include, for example, trilobes, tetralobes and the like. For the cylindrically shaped extrudates, the diameter can be in the range of from 1 to 20 mm, preferably, from 1 to 10 mm, and, most preferably, from 1 to 4 mm. The length-to-diameter ratio of the cylindrically shaped extrudate can be in the range of from 0.5 to 2, preferably, from 0.7 to 1.5, and, most preferably, from 0.8 to 1.2. For the non-extruded shapes, such as spheres, pills and pellets, the diameter can be in the range of from 1 to 20 mm, preferably, from 1 to 10 mm, and, most preferably, from 1 to 4 mm.

The shaped inorganic material is then dried at a temperature generally in the range of from about 75° C. to 300° C., and, preferably, from 90° C. to 250° C., for a sufficient period of time to provide a dried, shaped inorganic material. A typical drying time is in the range of from about 0.5 hours to 48 hours. The dried material is then calcined in the presence of an oxygen-containing gas, such as, air, at such a temperature and for such a calcination time period as to suitably calcine the dried material to thereby provide the calcined inorganic support material of the hydrogenation catalyst. The calcination time period can range from 0.5 hours to 48 hours, or longer. The calcination temperature can be in the range of from about 375° C. to about 750° C., and, preferably, from 400° C. to 700° C.

The noble metal component is incorporated into the calcined shaped inorganic material by any suitable means or method known to those skilled in the art for incorporating a metal into an inorganic support material to thereby provide the hydrogenation catalyst of the invention. It is preferred, however, to incorporate the noble metal into the calcined shaped inorganic material by the use of standard incipient wetness impregnation techniques. Under this method, the calcined shaped inorganic material is impregnated with the noble metal by contacting the calcined shaped inorganic material with an impregnation solution comprising a solvent and a salt of the noble metal. The impregnation solution will generally have a concentration of palladium or platinum metal compound in the solution in the range of from 0.01 to 10 mole per liter of solution. Any suitable solvent can be used for the impregnation solution, but the preferred solvent is water.

It is preferred for the palladium compound used to form the impregnation solution to be a palladium salt, which is preferably a water-soluble salt. Examples of such possible compounds include palladium chloride, palladium nitrate, hexachloropalladic acid, ammonium hexachloropalladate, tetramminepalladium nitrate, tertamminepalladium chloride, tertaminepalladium nitrate, and other coordination compounds of divalent and tetravalent palladium. The preferred palladium salts are those that do not contain chlorine and, among those, palladium nitrate is the most preferred.

Possible platinum compounds used to form the impregnation solution include platinum salts, which preferably are water-soluble. Among these are the platinum compounds such as platinum chloride, hexachloroplatinic acid, ammonium hexachloroplatinate, tetraammineplatinum chloride, tetraammineplatinum carbonate, tetraammineplatinum hydroxide, platinum nitrate, and many other complex (coordination) compounds of divalent and tetravalent platinum.

The metal impregnated, shaped inorganic material is dried at a temperature generally in the range of from about 75° C. to 300° C., and, preferably, from 90° C. to 250° C., for a sufficient period of time to provide a dried metal impregnated, shaped inorganic material. A typical drying time is in the range of from about 0.5 hours to 48 hours. The metal impregnated, dried material is then calcined in the presence of an oxygen-containing gas, such as, air, at such a temperature and for such a calcination time period as to suitably calcine the metal impregnated, dried material to thereby provide the final hydrogenation catalyst of the invention. The calcination time period can range from 0.5 hours to 48 hours, or longer. The calcination temperature can be in the range of from about 375° C. to about 750° C., and, preferably, from 400° C. to 700° C.

The pore structure of the hydrogenation catalyst can also be one of its important attributes in that the pore structure can contribute to the properties of the hydrogenation catalyst that allow for the effective processing of polyalphaolefin feedstock having a concentration of organic halide. The pore volume of the hydrogenation catalyst, as measured using a standard mercury intrusion method in the pressure range between atmospheric pressure to about 60,000 psi and using a contact angle of 140° with a mercury surface tension of 474 dyne/cm at 25° C., can be in the range of from about 0.4 $cm^3$/gram to about 0.8 $cm^3$/gm. Preferably, the pore volume of the hydrogenation catalyst is in the range of from 0.45 to 0.7 $cm^3$/gram, and, more preferably, from 0.5 to 0.6 $cm^3$/gram. The surface area of the hydrogenation catalyst can be in the range of from about 100 $m^2$/gram to about 800 $m^2$/gram. The surface area is that as measured by nitrogen absorption using the well-known BET method as described in detail by Brunauer, Emmet and Teller in *J. Am. Chem. Soc.* 60 (1938) 309-316, which is incorporated herein by reference. Preferably, the surface area is in the range of from 150 m²/gram to 600 m²/gram and, more preferably, from 350 m²/gram to 500 m²/gram. Typically, the loss on ignition of the hydrogenation catalyst at 800° C. can be in the range of from or about 2 weight percent to or about 8 weight percent with the weight percent being based on the total weight of the hydrogenation catalyst when dry.

It is particularly desirable for the hydrogenation catalyst of the invention to a skin type catalyst; that is, it is preferred for the noble metal component to be distributed predominantly on the inorganic support as a skin, with a high concentration of the noble metal being present near the surface of the inorganic support and a low concentration of the noble metal being present towards the center of the inorganic support. More specifically, it is beneficial for the concentration of the noble metal to be predominantly in the outer 50 to 250 micrometers of the surface of the shaped particles of inorganic support. Preferably, the distribution of the noble metal throughout the shaped inorganic support particle is such that the relative noble metal concentration in the outer 50 to 250 micrometers of the skin of the shaped inorganic support particle is from 1.5 to 7 times the average concentration of the noble metal throughout the entire shaped inorganic support particle.

While the reasons are not known with certainty, it is believed that the composition of the inorganic support material in combination with the noble metal component of the hydrogenation catalyst is a particularly important aspect of the invention in that it provides the property of dual functionality; that is, the concurrent ability to convert the organic halides in the polyalphaolefin feedstock to form hydrogen halides and to hydrogenate the unsaturated compounds in the polyalphaolefin feedstock while also being resistant to deactivation caused by the presence of halide compounds in the polyalphaolefin feedstock to be treated. It is also believed that other of the attributes of the hydrogenation catalyst provide for its dual functionality.

The reaction conditions under which the polyalphaolefin feedstock is contacted with the hydrogenation catalyst are such as to effectively convert at least a portion of the organic halides contained in the polyalphaolefin feedstock to form corresponding hydrogen halides and other compounds and to effectively saturate, or hydrogenate, at least a portion of the unsaturated compounds contained in the polyalphaolefin feedstock. The reaction temperature can, generally, be in the range of from 50° C. to 450° C., preferably, from 100° C. to 400° C., and, most preferably, from 150° C. to 350° C. The reaction pressure can, generally, be in the range of from 50 psia to 2700 psia, preferably, from 100 psia to 1500 psia, and, most preferably, from 250 psia to 1000 psia.

The flow rate at which the polyalphaolefin feedstock is charged to the reaction zone containing the hydrogenation catalyst is such as to provide a weight hourly space velocity ("WHSV") in the range exceeding 0 hr$^{-1}$ upwardly to about 1000 hr$^{-1}$. The term "weight hourly space velocity", as used herein, means the numerical ratio of the rate at which a hydrocarbon feed is charged to the reaction zone in pounds per hour divided by the pounds of hydrogenation catalyst contained in the reaction zone to which the hydrocarbon feed is charged. The preferred WHSV is in the range of from 0.1 hr$^{-1}$ to 250 hr$^{-1}$, and, most preferred, from 0.5 to 100 hr$^{-1}$.

It is preferred for the polyalphaolefin feedstock to be contacted with the hydrogenation catalyst in the presence of hydrogen gas. The amount of hydrogen gas charged to the reaction zone relative to the amount of polyalphaolefin feedstock charged to the reaction zone is in the range upwardly to about 10,000 cubic meters hydrogen (at standard temperature and pressure conditions of 20° C. and 1 atmosphere) per cubic meter of polyalphaolefin feedstock (at feed conditions), but, preferably, from 10 to 5,000 m³/m³, and, most preferably, from 20 to 1,000 m³/m³.

The contacting of the polyalphaolefin feedstock with the hydrogenation catalyst under suitable reaction conditions provides for the yielding of an intermediate polyalphaolefin product having a concentration of hydrogen halide. The presence of the hydrogen halide in the intermediate polyalphaolefin product in most instances makes it unsuitable as a polyalphaolefin end-product; and, therefore, at least a portion of the hydrogen halide in the intermediate polyalphaolefin product should be removed therefrom to thereby provide a polyalphaolefin end-product having a low concentration of organic halide as well as a low concentration of hydrogen halide. Such a polyalphaolefin end-product has the properties that make it particularly suitable as a lubricant base stock or blending component.

Any means or method can suitably be used to remove the hydrogen halide from the intermediate polyalphaolefin product. Generally, the intermediate polyalphaolefin product can be contacted with material that provides for the removal of at least a portion of the hydrogen halide contained in the intermediate polyalphaolefin product.

One suitable treatment method includes the treatment of the intermediate polyalphaolefin product with a caustic solution to thereby remove a portion of the hydrogen halide contained in the intermediate polyalphaolefin product. The caustic solution can be a mixture of water and sodium hydroxide. This caustic treatment can include the contacting and mixing of the intermediate polyalphaolefin product with the caustic solution followed by the separation of the caustic solution from the polyalphaolefin to thereby yield the polyalphaolefin end-product having a low concentration of both organic halide and hydrogen halide. Another treatment method includes passing the intermediate polyalphaolefin product over a solid bed of a suitable adsorbent for removing the hydrogen halide from the intermediate polyalphaolefin. An example of such a suitable adsorbent includes particles comprising a mixture of calcium oxide and zinc oxide. One commercially available product that can suitably be used to treat the intermediate polyalphaolefin product is KataLeuna's product containing zinc oxide and calcium oxide.

An optional, yet desirable, step for treating the intermediate polyalphaolefin product prior to the aforedescribed treatment step includes passing the polyalphaolefin product to a separation zone defined by a separation vessel which provides means for separating a vapor phase comprising hydrogen halide and a liquid phase. The liquid phase undergoes the further treatment to remove a portion of the hydrogen halide remaining therein.

The concentration of organic halide in the polyalphaolefin end-product is such as to provide a halogen concentration of less than 100 ppmw. But, preferably, the halogen concentration is less than 50 ppmw, and, most preferably, it is less than 10 ppmw.

Now referring to FIG. 1, which is a schematic diagram representing process system 10 for the processing of a polyalphaolefin feedstock having a concentration of organic halide and unsaturated compounds to produce a polyalphaolefin end-product having a low concentration of halide compounds. The polyalphaolefin feedstock is introduced by way of conduit 12 into hydrogenation reactor 14, which defines a reaction zone and contains a bed 16 of a hydrogenation catalyst. Hydrogen gas passes by way of conduit 18 and is mixed with the polyalphaolefin feedstock to be introduced concurrently with the polyalphaolefin feedstock into hydrogenation reactor 14. Reactor 14 is operated under reaction conditions suitable for the conversion of at least a portion of the organic halides contained in the polyalphaolefin feedstock and for the hydrogenation of at least a portion of the unsaturated compounds contained in the polyalphaolefin feedstock.

An intermediate polyalphaolefin product containing a concentration of hydrogen halide is yielded as a reactor effluent from hydrogenation reactor 14 by way of conduit 20. The reactor effluent is charged to hydrogen halide removal system 22 which provides means for separating at least a portion of the hydrogen halide contained in the intermediate polyalphaolefin product to thereby yield by way of conduit 24 a polyalphaolefin end-product having a reduced concentration of organic halide that is less than the concentration of organic halide in the polyalphaolefin feedstock.

Hydrogen halide removal system 22 can further include separation vessel 26 and contacting system 28. Separation vessel 26 defines a separation zone and provides means for separating a vapor phase comprising hydrogen halide and a liquid phase comprising polyalphaolefin. The vapor phase passes from separation vessel 26 through conduit 30 and the liquid phase, which still contains hydrogen halide, passes through conduit 32 to contacting system 28. Contacting system 28 defines a zone for the removal of hydrogen halide from the liquid phase of polyalphaolefin and provides means for contacting the liquid phase with material that provides for the removal of hydrogen halide therefrom such as caustic or a solid adsorbent to thereby yield the polyalphaolefin end-product having a low concentration of organic halide.

Reasonable variations, modifications and adaptations can be made within the scope of the described disclosure and the appended claims without departing from the scope of the invention.

That which is claimed is:

1. A method for producing a polyalphaolefin product having a low concentration of organic halide, said method comprises:

contacting a polyalphaolefin feedstock, said polyalphaolefin feedstock comprises polyalphaolefin, an unsaturated compound and an organic halide, with a hydrogenation catalyst having dual functionality such that it is effective in both the conversion of at least a portion of said organic halide in said polyalphaolefin feedstock and the hydrogenation of at least a portion of said unsaturated compound of said polyalphaolefin feedstock, wherein said contacting is conducted under reaction conditions suitable for the conversion of at least a portion of said organic halide to form hydrogen halide and for the hydrogenation of at least a portion of said unsaturated compound, thereby providing an intermediate polyalphaolefin product having a concentration of an hydrogen halide; and removing at least a portion of said hydrogen halide from said intermediate polyalphaolefin product to thereby provide said polyalphaolefin product.

2. A method as recited in claim 1, wherein said hydrogenation catalyst comprises a noble metal of either platinum or palladium and a support comprising silica and alumina.

3. A method as recited in claim 2, wherein said silica of said support is present in the range of from about 20 weight percent to about 50 weight percent of said support, said alumina of said support is present in the range of from about 50 weight percent to about 80 weight percent of said support, and the concentration of noble metal on said support is in the range of from about 0.1 weight percent to about 1.5 weight percent.

4. A method as recited in claim 3, wherein the concentration of said organic halide in said polyalphaolefin feedstock is such as to provide the concentration of halogen therein to be in the range exceeding 100 ppmw to about 15,000 ppmw.

5. A method as recited in claim 4, wherein said polyalphaolefin feedstock is made by the catalytic oligomerization of an alpha olefin feed, which said alpha olefin feed comprises at least one alpha olefin selected from alpha olefins having from 4 to about 18 carbon atoms per molecule.

6. A method as recited in claim 5, wherein said low concentration of organic halide in said polyalphaolefin product is such as to provide the concentration of halogen therein to be in the range of less than 100 ppmw.

7. A method as recited in claim 6, wherein said reaction conditions include a reaction temperature in the range of from 50° C. to 450° C., a reaction pressure in the range of from 50 psia to 2700 psia, a WHSV in the range exceeding 0 hr−1 upwardly to 1000 hr−1, wherein said contacting step further includes contacting of the polyalphaolefin feedstock with said dual functionality catalyst in the presence of hydrogen gas at a volumetric ratio of hydrogen gas to polyalphaolefin feedstock in the range upwardly to about 10,000 cubic meters per cubic meter.

8. A method as recited in claim 7, wherein said removing step includes:

contacting said intermediated polyalphaolefin product with a suitable material that is effective in the removal of at least a portion of the hydrogen halide contained in said intermediate polyalphaolefin product and to thereby yield said polyalphaolefin product.

9. A method, comprising:

contacting under hydrogenation conditions a polyalphaolefin feed stream, which has a concentration of organic halide, with a hydrogenation catalyst having dual functionality such that it is effective in both the conversion of at least a portion of said organic halide in said polyalphaolefin feed stream and the hydrogenation of at least a portion of said unsaturated compound of said polyalphaolefin feed stream, and yielding an intermediate polyalphaolefin product having a concentration of hydrogen halide; and removing at least a portion of said hydrogen halide from said intermediate polyalphaolefin product to thereby provide a polyalphaolefin product having a low halogen concentration.

10. A method as recited in claim 9, wherein said hydrogenation catalyst comprises palladium supported on an inorganic support material, wherein the palladium is present in said hydrogenation catalyst in the range of from about 0.1 to about 8 weight percent and said inorganic support material comprises from about 10 to about 60 weight percent silica and from about 40 to about 90 weight percent alumina.

11. A method as recited in claim 9, further comprising:

passing said hydrogen halide-containing intermediate polyalphaolefin product to separation zone containing means for separating a vapor phase comprising hydrogen halide and a liquid phase containing a reduced concentration of hydrogen halide, and;

further treating said liquid phase to remove a portion of the hydrogen halide remaining therein.

12. A method as recited in claim 9, wherein said hydrogen halide removal step comprises:

contacting said intermediated polyalphaolefin product with a suitable material that is effective in the removal of at least a portion of the hydrogen halide contained in said intermediate polyalphaolefin product to thereby yield said polyalphaolefin product.

13. A method as recited in claim 12, wherein said hydrogenation conditions include a reaction temperature in the range of from 50° C. to 450° C., a reaction pressure in the range of from 50 psia to 2700 psia, a WHSV in the range of from 0.01 hr−1 to 1000 hr−1, and a hydrogen treat gas rate such that the volumetric ratio of hydrogen gas to polyalphaolefin feedstock is in the range upwardly to 10,000 cubic meters.

14. A method as recited in claim 13, wherein said concentration of organic halide in the polyolefin feed stream is such that the halogen concentration is in the range of from 100 ppmw to 15,000 ppmw.

15. A method as recited in claim 14, wherein said low halogen concentration in said polyalphaolefin product is less than 100 ppmw.

16. A method as recited in claim 15, wherein said suitable material for the removal of at least a portion of the hydrogen halide contained in said intermediate polyolefin product is a caustic solution comprising water and sodium hydroxide.

17. A method as recited in claim 8, wherein said low concentration of organic halide in said polyalphaolefin product is such as to provide the concentration of halogen therein of less than 50 ppmw.

18. A method as recited in claim 15, wherein said suitable material for the removal of at least a portion of the hydrogen halide contained in said intermediate polyolefin product is an adsorbent comprising calcium oxide and zinc oxide.

19. A method as recited in claim 8, wherein said low concentration of organic halide in said polyalphaolefin product is such as to provide the concentration of halogen therein of less than 10 ppmw.

* * * * *